United States Patent
Mattos

(10) Patent No.: US 8,031,815 B2
(45) Date of Patent: Oct. 4, 2011

(54) SYSTEM AND METHOD FOR ACQUISITION OF SIGNALS

(75) Inventor: Philip Mattos, Ruardean Woodside (GB)

(73) Assignee: STMicroelectronics (Research & Development) Limited, Buckinghamshire (GB)

( * ) Notice: Subject to any disclaimer, the term of this patent is extended or adjusted under 35 U.S.C. 154(b) by 1145 days.

(21) Appl. No.: 11/431,396

(22) Filed: May 10, 2006

(65) Prior Publication Data

US 2006/0285581 A1 Dec. 21, 2006

(30) Foreign Application Priority Data

May 10, 2005 (GB) .................................. 0509533.6
Sep. 7, 2005 (EP) .................................. 05255470
Feb. 21, 2006 (EP) .................................. 06250915

(51) Int. Cl.
*H03D 1/00* (2006.01)

(52) U.S. Cl. ........ 375/343; 375/137; 375/150; 375/316; 375/340; 375/342; 375/349

(58) Field of Classification Search .................. 375/130, 375/136, 147, 149–150, 324–326, 339, 340, 375/342–343, 349, 316
See application file for complete search history.

(56) References Cited

U.S. PATENT DOCUMENTS

| | | | |
|---|---|---|---|
| 4,468,793 A | 8/1984 | Johnson et al. | |
| 6,084,851 A * | 7/2000 | Iwasaki | 370/204 |
| 6,330,432 B1 * | 12/2001 | Tong et al. | 455/226.3 |
| 6,385,233 B1 * | 5/2002 | Berger | 375/216 |
| 6,501,788 B1 * | 12/2002 | Wang et al. | 375/148 |
| 6,873,664 B1 | 3/2005 | Clark | |
| 6,922,167 B2 * | 7/2005 | Gerein | 342/357.12 |
| 6,959,030 B1 | 10/2005 | Clark | |

OTHER PUBLICATIONS

Y. Zhu et al., "A New Family of Polyphase Sequences for CDMA with Good Odd and Even Correlation Properties", 1999 IEEE, pp. 198-202.
Katsuya Mizutani et al., "Design of Pseudo-Noise Sequences for a Spread Spectrum Communication and Ranging System", Proceedings of the IEEE Intelligent Vehicles Symposium 2000. Oct. 3-5, 2000. pp. 418-423.
Kari H.A. Karkkainen et al., "Performance of an Asynchronous DS/SSMA (DS/CDMA) System with Kronecker Sequences", 7 pages, Sep. 1991.
Y. Zhu et al., "A New Signature Sequence Scheme for CDMA with Good Mean-Square Correlation Properties", 1999 IEEE, pp. 564-568.

* cited by examiner

*Primary Examiner* — Chieh M Fan
*Assistant Examiner* — Sophia Vlahos

(57) ABSTRACT

A system for processing a received signal having at least one code applied thereto, the received signal having a frequency, the system comprising: first correlator circuitry arranged to correlate the received signal with a first code to provide an output; second correlator circuitry arranged to correlate the received signal with a second code to provide an output, wherein the first code and the second code are different; and processor for processing together the outputs of the first and second correlator circuitry to cancel the frequency.

20 Claims, 8 Drawing Sheets

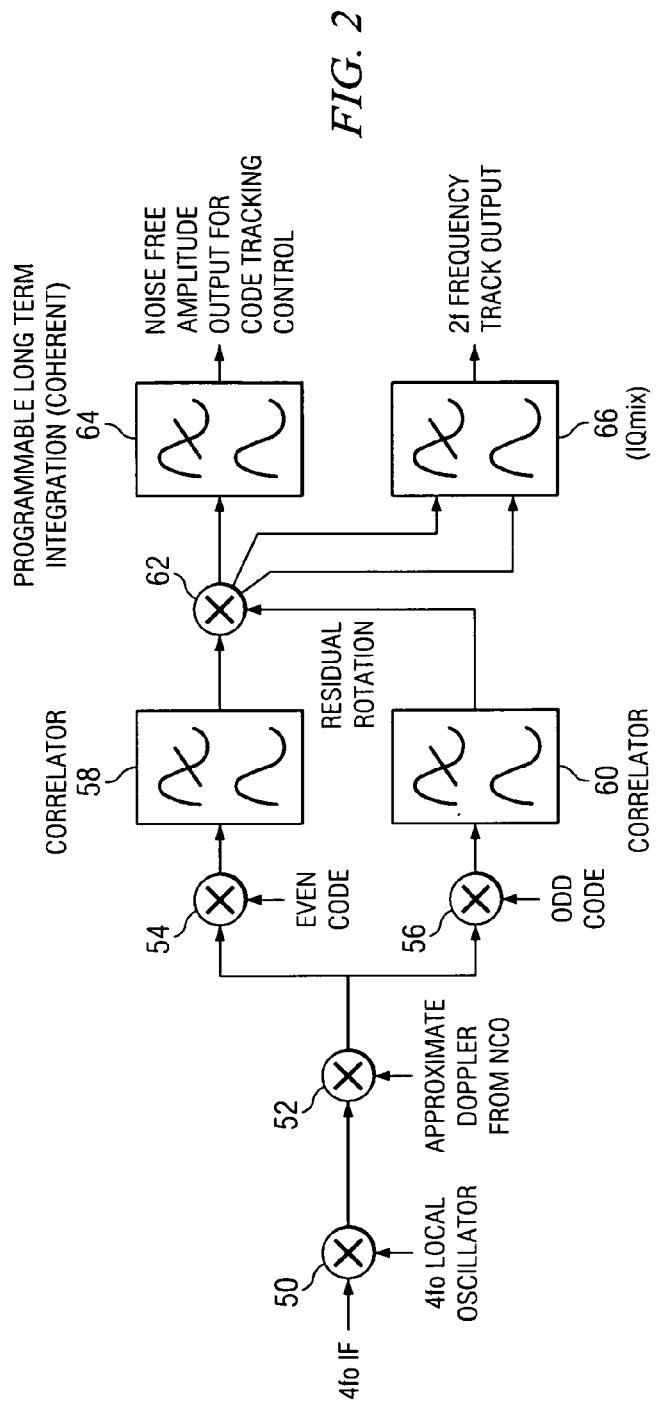

*FIG. 4*

| | | | | | | | |
|---|---|---|---|---|---|---|---|
| B CODE | -1 | -1 | +1 | +1 | -1 | +1 | +1 |
| C CODE | -1 | +1 | +1 | +1 | +1 | -1 | +1 |
| B-C CODE | 0 | -2 | 0 | 0 | -2 | +2 | 0 |
| SCALED CODE | 0 | -1 | 0 | 0 | -1 | +1 | 0 |
| SIGNAL b-c | 0 | -2 | 0 | 0 | -2 | +2 | 0 |
| CORRELATION IN | 0 | +2 | 0 | 0 | +2 | +2 | 0 |

FULL POWER RECOVERED WHEN D\=SECONDARY CODE, OTHERWISE ZERO, AND THREE STATE CODE NEEDED (+,-,DISABLE)

*FIG. 5*

| | | | | | | | |
|---|---|---|---|---|---|---|---|
| B CODE | -1 | -1 | +1 | +1 | -1 | +1 | +1 |
| C CODE | -1 | +1 | +1 | +1 | +1 | -1 | +1 |
| B-C CODE | 0 | -2 | 0 | 0 | -2 | +2 | 0 |
| B+C CODE | -2 | 0 | +2 | +2 | 0 | 0 | +2 |

D=SECONDARY CODE

| | | | | | | | |
|---|---|---|---|---|---|---|---|
| SIGNAL b-c | 0 | -2 | 0 | 0 | -2 | +2 | 0 |
| CORRELATION IN | 0 | +2 | 0 | 0 | +2 | +2 | 0 |

D/=SECONDARY CODE

| | | | | | | | |
|---|---|---|---|---|---|---|---|
| SIGNAL b+c | -2 | 0 | +2 | +2 | 0 | 0 | +2 |
| CORRELATION IN | +2 | 0 | +2 | +2 | 0 | 0 | +2 |

FULL POWER RECOVERED BOTH WHEN D=SECONDARY CODE, AND D/=SECONDARY, IN DIFFERENT PATHS

SYSTEM AND METHOD FOR ACQUISITION OF SIGNALS

TECHNICAL FIELD OF THE INVENTION

The present invention relates to a system and method for the acquisition of signals and, in particular, but not exclusively to the acquisition or tracking of spread spectrum navigation signals such as used in global navigation satellite systems GNSS. The present invention also relates to the acquisition or tracking of broadcast pseudo random codes, in particular codes transmitted as part of a satellite navigation signal such as a GPS or GNSS signal.

BACKGROUND OF THE INVENTION

One example of a global navigation satellite system is the Global Positioning System GPS. The global position system (GPS) uses satellites orbiting the earth in known orbit paths with accurately known positions. These satellites transmit signals which can be received by a receiver on earth. Using signals received from four or more satellites, the receiver is able to determine its position using trigonometry. The signals transmitted by the satellite comprise pseudo-random codes. The accuracy of the determination of position is dependent on factors such as the repetition rate of the code, the components of the receiver and atmospheric factors.

The accuracy of measurement can be improved if the signals from more than four satellites are taken into account. GPS receivers can receive signals from up to twelve satellites at a time.

GALILEO is a European initiative for a global navigation satellite system which provides a global positioning service. It has been proposed that GALILEO be interoperable with GPS and GLONASS, the two other global satellite navigation systems. It should be appreciated that the term GNSS is used in this document to refer to any of these global positioning systems.

GALILEO has a system of thirty satellites, twenty-seven operational satellites with three operational in-orbit spares. The proposed frequency spectrum for GALILEO has two L-bands. The lower L-band, referred to as E5a and E5b, operate in the region of 1164 MHz to 1214 MHz. There is also an upper L-band operating from 1559 MHz to 1591 MHz.

In GPS, the frequency signals themselves are called the carriers. Since the carriers are pure sinusoids, they have two binary codes modulated onto them. The two binary codes are the C/A (coarse acquisition) codes and the P (precise) code.

Information on the coordinates of the satellite is also sent within the messages broadcast by the satellite and is modulated onto the carriers.

The coarse/acquisition (C/A code) was originally used as a coarse position measurement signal or as an acquisition code in order to assist locking onto the phase of the precise code. However, the C/A code is now used for acquisition and for position tracking. The C/A code is a pseudo-random (PN) binary code which consists of 1023 elements or chips that repeat every millisecond.

The C/A code is a Gold code. The cross correlation property of a Gold code is such that the correlation function between two different sequences is low. In other words, when a received signal is correlated with the correct C/A code the desired signal can be easily distinguished from other signals which appear as background noise.

In GPS and GALILEO, signals are broadcast from satellites which include these pseudo random codes which are processed at a receiver to determine position data. The processing involves first determining the relative offset of the received codes with locally generated versions of the codes (acquisition) and then determining the position once the relative offset is determined (tracking). Both acquisition and tracking involve correlating received signals with a locally generated version of the pseudo random codes over an integration period.

In spread spectrum systems, acquisition is difficult because it is two dimensional (frequency and time). A further difficulty is that because the signals are much weaker inside as compared to outside, it is much more difficult to acquire signals indoors. In particular, the indoor operation of GNSS requires the reception of signals attenuated by at least 20 dB from the outdoor equivalents.

The number of cells in the time domain is for example 2046. The number of cells in the frequency domain is 20 for outdoors at 1 KHz bandwidth or 2000 for indoors at 10 Hz bandwidth. This latter number of cells can be reduced to 20 with a temperature controlled crystal oscillator TCXO. This means that the total number of cells to be searched is 2046 times 20 i.e. around 40,000. For outdoors, each cell takes one millisecond and for indoors, each cell would take 100 milliseconds because of the weaker signal strength. This results in a search time of 40 seconds for outdoors or 4000 seconds for indoors, on a single correlator.

This problem traditionally is addressed by using parallelism in the frequency domain, for example sixteen fast Fourier transform channels or by parallelism in the time domain, using parallel correlators. To achieve parallelism requires faster clocks or more hardware which is disadvantageous. Additionally, more hardware or faster clocks require increased power.

In any event, the fundamental limit is the stability of the reference clock which prevents bandwidth reduction to the degree required for indoor sensitivity.

As already mentioned the indoor signals can be attenuated by at least 20 dB from their outdoor equivalents. To increase the sensitivity by twenty dB for the indoor signals means integrating for a hundred times longer. However, this is difficult to achieve because as the coherent integration period is extended, the bandwidth of the channel is narrowed. This in turn requires many more searches to be carried out and eventually the stability of the reference oscillator becomes a limiting factor as a signal appears to wander from one frequency to another, even before acquisition is completed. This results in a spreading of the energy, preventing further gain.

In addition, the modulation method used may provide a limit on the integration time.

Thus there are problems in performing integration with such signals. The integration time is limited by the accuracy of a local clock and the frequency shifts caused by relative motion of the satellite and receiver.

It is an aim of embodiments of the invention to address one or more of these problems.

SUMMARY OF THE INVENTION

To address the above-discussed deficiencies of the prior art, an aspect of the present invention is to provide a system for processing a received signal having at least two channels, each of said channels having the same carrier frequency and the same data carried thereby, said first and second channels having respective first and second codes applied thereto, said first and second codes being different, said system comprising correlation circuitry arranged to correlate the received signal with a third code to provide an output, said third code being derived from a function of said first and second codes;

and processing means for providing an output for at least one of: tracking of said signal; acquisition of said signal; and extracting information from said signal.

According to a second aspect of the present invention there is provided a receiver for receiving from a source a signal having at least two channels, each of said channels having the same carrier frequency and the same data carried thereby, said first and second channels having different spreading codes applied thereto.

According to a third aspect of the present invention there is provided a transmitter for transmitting a signal having at least two channels, each of said channels having the same carrier frequency and the same data carried thereby, said first and second channels having different spreading codes applied thereto.

According to a fourth aspect of the present invention there is provided a system for processing a received signal having at least a first code and a second code applied thereto, said received signal having a frequency, said system comprising first correlator circuitry arranged to correlate the received signal with a third code derived from said first and second code to provide an output; second correlator circuitry arranged to correlate the received signal with a fourth code to provide an output, said fourth code being derived from said first and second code, wherein said third code and said fourth codes are different; and processing means for processing the outputs of said first and second correlator circuitry together.

According to a fifth aspect of the present invention there is provided a system for processing a received signal having at least one code applied thereto, said received signal having a frequency, said system comprising first correlator circuitry arranged to correlate the received signal with a first code to provide an output; second correlator circuitry arranged to correlate the received signal with a second code to provide an output, wherein said first code and said second code are different; and processing means for processing the outputs of said first and second correlator circuitry together to cancel said frequency.

According to a sixth aspect of the present invention there is provided a method for processing a received signal having at least one code applied thereto, said received signal having a frequency, said method comprising the steps of correlating the received signal with a first code; correlating the received signal with a second code, wherein said first code and said second code are different; and processing together the results of the first and second correlating steps to cancel said frequency.

According to a seventh aspect of the present invention method for processing a received signal having at least two channels, each of said channels having the same carrier frequency and the same data carried thereby, said first and second channels having respective first and second codes applied thereto, said first and second codes being different, said method comprising correlating the received signal with a third code to provide an output, said third code being derived from a function of said first and second codes; and processing said output to provide an output for at least one of: tracking of said signal; acquisition of said signal; and extracting information from said signal According to an eighth method for processing a received signal having at least a first code and a second code applied thereto, said received signal having a frequency, said method comprising correlating the received signal with a third code derived from said first and second code to provide an output; correlating the received signal with a fourth code to provide an output, said fourth code being derived from said first and second code, wherein said third code and said fourth codes are different; and processing the outputs of said first and second correlating steps together.

In one receiver embodying the invention, two or more signals derived from a transmitter having coherent carrier signals are multiplied by two or more local codes to produce signals of coherent carrier but independent noise. These signals are multiplied together to produce for example an output signal comprising sum and difference signals and then integrated over an integration period.

By multiplying signals together that are derived from the transmitter and which are coherent, the integration period is no longer limited by frequency drift either due to local clock variation or due to Doppler shift between the transmitter (satellite) and receiver. This is because the carrier signals are coherent. In a sense, one of the signals derived from the transmitter is used as a "local" oscillator signal for the other.

In one embodiment, the two or more local codes comprise first and second different codes corresponding to different codes within the signals derived from the transmitter. In the GALILEO example, these codes are two different codes relating to the L1B and L1C signals. These are transmitted on the same carrier, are multiplied in the receiver separately by the respective local b and c codes, and then these signals multiplied together.

In this embodiment, the received signal may comprise two different codes broadcast at the same carrier frequency.

In another embodiment, the two or more codes are derived from one code. Preferably there are two codes that are derived from one code corresponding to a code in the signal broadcast from one satellite. The two derived codes are orthogonal. This is achieved by taking a code sequence and sampling, for example, taking even samples and odd samples to generate two respective orthogonal codes. Such codes have zero cross correlation when synchronised.

The incoming received signal from one satellite comprising a mixture of signal and noise is multiplied by these two orthogonal codes derived from a local version of the code in the satellite signal. The resulting signals when multiplied together have zero frequency offset as the signals are derived from a single satellite signal. In this embodiment, the signal comprises a single code broadcast at a carrier frequency.

The techniques may be used in acquisition or tracking of signals. The second embodiment in which the local code is halved into odd and even samples is particularly useful for code acquisition.

The first embodiment is particularly beneficial for the GALILEO system in which two separate codes are broadcast on the same carrier. The second embodiment is particularly beneficial for the GPS system in which a single code is broadcast on a carrier.

The embodiments of the invention may be embodied in a method of acquiring or tracking signals, in a semiconductor integrated circuit for processing, acquiring or tracking received broadcast signals or in a receiver for such.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; and the term "circuitry" may mean any device, system or part thereof that controls at least one operation, such a device may be implemented in hardware, firmware or software, or some combination of at least two of the same. It should be noted that the functionality associated with any particular circuitry may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a better understanding of the present invention and as to how the same may be carried into effect, reference will now be made by way of example only to the accompanying figures, in which like reference numerals represent like parts, and in which:

FIG. 1 shows the despreading codes used in embodiments of the invention;

FIG. 2 shows schematically an arrangement embodying the present invention;

FIG. 4 shows Tricode Hexaphase signalling as used in the prior art;

FIG. 5 shows Tricode Hexaphase signalling as used in embodiments of the invention;

DETAILED DESCRIPTION

Figure 3:
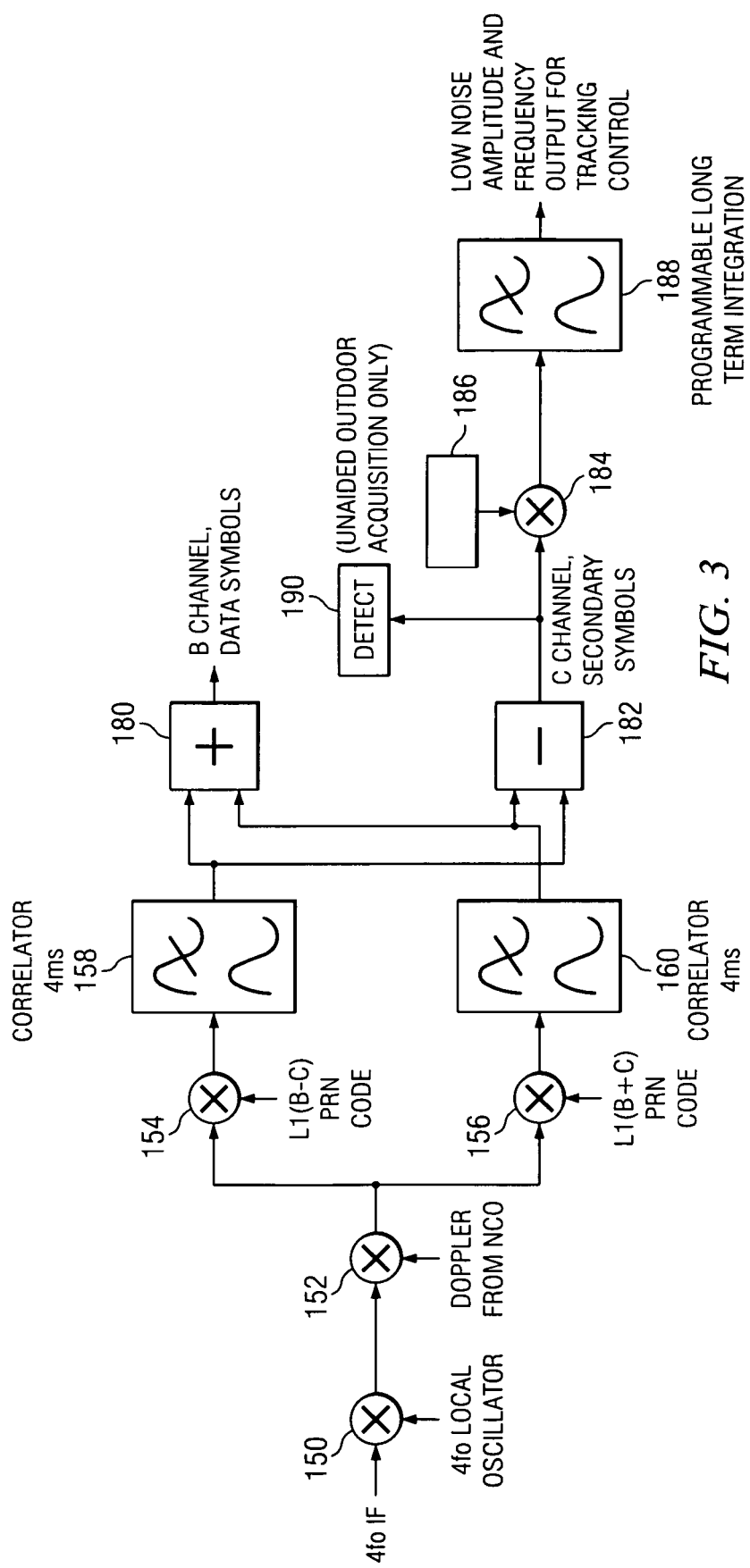
FIG. 3 shows a third arrangement embodying the present invention.

FIGS. 2 through 10, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged system operable to acquire or track broadcast pseudo random codes, in particular codes transmitted as part of a satellite navigation signal such as a GPS or GNSS signal.

The embodiments described are in relation to a GNSS receiver for GNSS signal acquisition and tracking. Embodiments of the present invention are particularly applicable to the GALILEO system and other satellite navigation systems such as the GPS system operated by the US government or any other global navigation satellite system.

It should be appreciated that whilst embodiments of the present invention have been used particularly in the context of acquisition of signals for global navigation satellite systems, embodiments of the present invention can be used for the acquisition of any other signals.

Embodiments of the present invention are particularly applicable to the acquisition of spread spectrum signals.

It should be appreciated that embodiments may be implemented to provide a software equivalent to the circuitry shown in the embodiments described hereinafter. Embodiments may be implemented in hardware only. Particularly preferred embodiments of the invention are implemented in hardware and software.

The acquisition circuitry can be incorporated in any suitable device which is to provide a positioning functionality. The device can be a portable device or part of a larger device. For example embodiments of the present invention can be incorporated in satellite navigation devices, communication devices such as mobile communication devices for example mobile phones or any device requiring position information. The satellite navigation devices can be stand alone devices or devices incorporated in various different forms of transport such as cars, trains, aeroplanes, balloons, ships, boats, trucks, helicopters or any other form of transport.

Preferred embodiments of the present invention, which will now be described, are incorporated in an integrated circuit. However, it should be appreciated that alternative embodiments of the present invention may be at least partially implemented in discrete circuitry.

The GALILEO L1 BOC (Binary offset carrier) (1,1) signals offer the potential for effective indoor operation as needed for mass-market receivers. However achieving that economically, especially acquisition at low signal strengths, remains a challenge. Architectures already proposed for GPS come into their own with the vastly improved cross-correlation performance of the GALILEO signal.

The BOC features of the signal are generally aids to accuracy, not acquisition, which they make significantly more difficult. However there are also attributes of the signals that make acquisition significantly less difficult. The L1C channel has a carrier, a primary spreading code c and a secondary code. Thus there is no data on the L1c channel. This removes the limit of coherent integration presented by the unknown data bits. If time can be adequately known, then the secondary codes present no problem to the acquisition engine, while greatly improving the cross-correlation performance by increasing the effective code-length from 4 to 100 milliseconds. The secondary codes are may be known relatively short codes.

If there is no access to time, then the secondary codes allow a tiered acquisition, saving processing MIPs (million instructions per seconds) over a single layer code of that length. This may require a significant amount of memory for intermediate results, giving great advantage to receivers with a software element, which can use memory flexibly.

However a major benefit in the signal format is the presence of two signals at the same frequency, synchronized perfectly at the carrier level. Additionally for acquisition purposes they are also synchronized at symbol level. The Carrier synchronization is guaranteed at the satellite by the phase angle definitions for the combination of the L1 a/b/c signals, so that the phase angle specifications ensure absolute frequency lock.

Given two carriers at precisely the same frequency, even though that frequency is relatively unknown due to satellite Doppler, user Doppler and reference oscillator error, advantage of this can be taken in the acquisition phase. This can be achieved by combining the signals in the receiver, thus effectively eliminating the unknown frequency, and separating the time domain acquisition from the frequency domain acquisition. In outdoor GPS, there may be a 20 KHz frequency search in 1 KHz bins and 2046 time domain bins making 40,000 searches to perform. Using these same parameters when the frequency and time searches can be separated means 2046 plus 20 searches. About 95% saving in search time and MIPS can be achieved.

The GALILEO code length is not yet published, since the change from BOC (2,2) to BOC (1,1). However the same percentage saving is expected, but may be even more significant because the baseline processing load is about 8 times higher, due to the BOC ($\times 2$) and the expected code length ($\times 4$).

The above methodology gives a huge advantage, but is only viable when a coherent integration period of 4 milliseconds (one symbol) is appropriate, possibly extended by subsequent non-coherent integration. This is because it requires both L1b and L1c signals, and the L1b signal has data symbols on it. For deeply attenuated indoor signals, advantage of the data-free L1c signal to extend the coherent integration period can be taken. Thus the frequency search is required, so optimization of the time domain search is even more important.

If there is access to a time reference at the 4-millisecond level, it is possible to predict the secondary code and thus eliminate it. This means that only 8192 time searches are required. For a totally unaided acquisition the secondary-code cannot be predicted, meaning that the L1c signal would appear to be no better than the data-modulated L1b signal. The data modulation is unknown but the secondary code, while unknown between 25 possible phases, does only have 25 possibilities, no matter if the desired integration period is 100 ms or 1 second. Thus it is possible to perform integrations over single 4 millisecond epochs, and accumulate them into 25 independent sets of results. These 25 sets of results are then post-processed against the 25 possible phases of the secondary code. One of the results yields a true coherent integration of the chosen length.

There are of course complexities. The coherent integration cannot be so long that it is incompatible with the width of the frequency bin, which itself must be wide enough to be compatible with the stability of the reference oscillator over the desired period. A set is a full correlation i.e. 8192 results. Even if carefully scaled to stay in a single byte, this is about 8 kbytes per set, 200 kbytes total. This amount of memory for intermediate results might not be viable on a hardware machine, where the memory could not be reused. However on a mixed hardware/DSP (digital signal processor)/CPU (computer processing unit) type implementation, it may be available for a short time before being reallocated either to tracking channels or to the CPU for application use.

A more efficient implementation may limit the number of intermediate results stored. However this may mean that an identity is stored with each result, extending its size. For example storing 100 results only, at 3 bytes each, would be 300 bytes per set, about 8 Kbytes total. Optimal performance would come from a triangular matrix, where say 8000 results are stored from the first epoch, then 4000+4000, then 2000+2000+2000+2000 etc, discarding earlier possibilities based on a temporary incoherent combination, or possibly running the secondary codes possibilities in real time. However this may involve excessive complexity, certainly for a full hardware implementation, making the hardware-DSP-CPU architecture preferable again.

Embodiments of the present invention greatly reduce the parallelism required for a given sensitivity, saving silicon and power, and also vastly speeding up acquisition by separating the time domain acquisition from the frequency domain, meaning n+m cells to search, not n.x.m, a 95% saving in the above examples.

In addition, it is resilient to unstable reference clocks, allowing the noise bandwidth to be reduced to extreme levels without missing the signal.

On a two-signal system, such as GALILEO L1B/C, the signal can be acquired without precise knowledge of frequency by combining the information from each signal.

They have identical Doppler shift from satellite movement, and identical Doppler shift from user motion, so after they have been separately de-spread and integrated to the level of bandwidth required, the two complex samples from each signal can be multiplied together and integrated again. The carrier element of each signal will have precisely the same frequency, therefore the product will be at zero Hz, and thus can be synchronously integrated for 4 milliseconds (the period of the data symbol). Thus the L1B (data) signal can be demodulated with no precise knowledge of the frequency.

This results in a (data x secondary code) stream, which can be multiplied by the known secondary code to recover the data, initially synchronising by looking for (preamble x secondary code). This is as described above.

Figure 7:
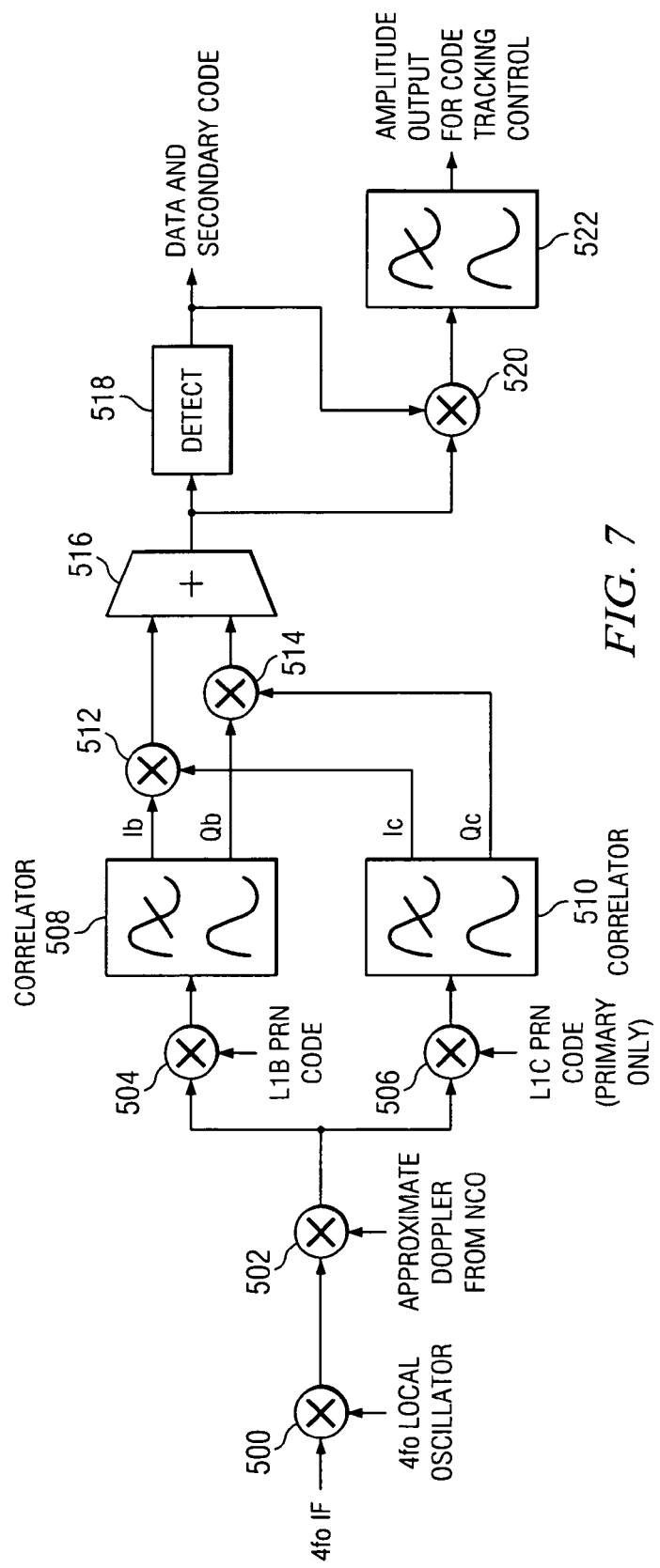
FIG. 7 shows an arrangement incorporating the first embodiment of the invention.

FIG. 7 shows circuitry for implementing the above described embodiment.

A signal is input to a first mixer 500. The first mixer 500 receives an intermediate frequency signal at a frequency of 4fo. fo is the nominal frequency i.e. the basic chipping rate which in the GALILEO system is 1.023 MHz. The input frequency is mixed with a frequency of 4fo from a local oscillator. The output of the first mixer will however still have a small frequency component due to the Doppler shift effect and other effects as mentioned previously. This is input to a second mixer 502. Estimation of the Doppler shift is used to generate an output from a numerically controlled oscillator which is input to the second mixer to further remove the frequency component. There may still however, be a small frequency component remaining.

The output of the second mixer 502 is input to a third mixer 504 and a fourth mixer 506. The third mixer 504 receives an input of the L1B spreading code i.e. b. The output of the third mixer is input to a first correlator 508. The signal input to the fourth mixer 506 is mixed with the L1C primary spreading code i.e. c. It is not mixed with the secondary code. The output of the fourth mixer is input to a second correlator 510. The correlators are in the form of synchronous, integrate and dump low pass filters. Thus, the output of the first correlator is the received signal correlated with the spreading code of the L1B channel whilst the output of the second correlator 510 is the received signal correlated with the L1C primary spreading code. Each of the correlators provides an I signal and a Q signal output. The I signals output by the first and second correlators 508 and 510 are input to a fifth mixer 512 whilst the Q outputs of the first and second correlators 508 and 510 are input to a sixth mixer 514. The output of the fifth and sixth mixers 512 and 514 are input to an adder 516.

The output of the adder 516 is input to a detection block 518, the output of which is the data of the L1B channel and the secondary code of the L1C channel. This output can be multiplied by the known secondary code to recover the data.

The output of the adder 516 is also input to a seventh mixer 520 which also receives the output of the detector 518. The mixed output provided by the seventh mixer 520 is input to a low pass filter 522 which provides an amplitude output for code tracking control. The data is thus removed from the signal which is at zero Hertz. This means that the resulting dc signal can be integrated for a longer period than the data symbol period.

Figure 8:
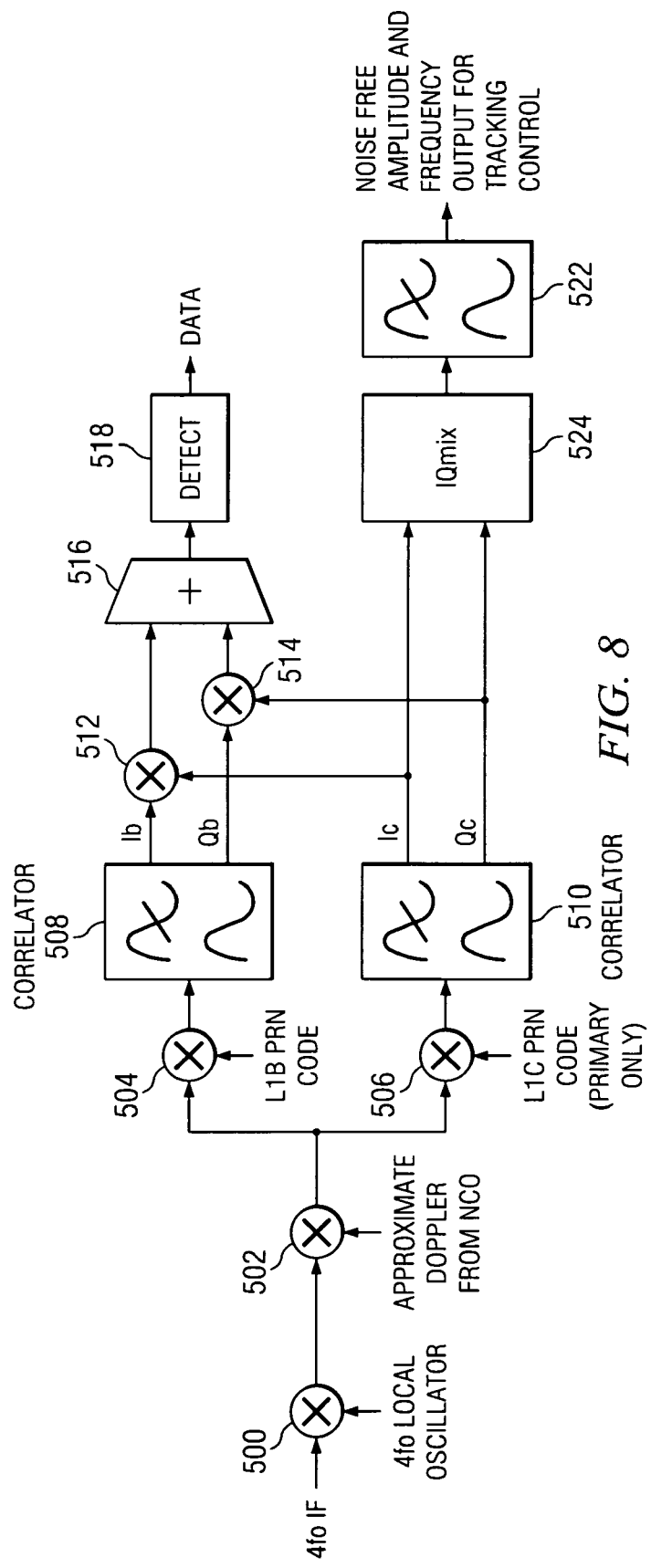
FIG. 8 shows a modification to the arrangement of FIG. 7 where there is only a primary code on the L1C channel.

FIG. 8 shows a modification to the arrangement of FIG. 7. In this modified embodiment, the signal on the L1B channel comprises the carrier, the spreading code b and data. This is as described in the embodiment of FIG. 7. However, the L1C channel comprises the carrier and the spreading code c. In other words, there is no secondary spreading code as described in the relation to the embodiment of FIG. 7. It should be appreciated that those elements which operate in the same or similar way to that shown in FIG. 7 are referenced by the same reference numerals. However, since the L1C channel only has the primary spreading code, the output of the second correlator 510 can be put into IQ mix circuitry 524 which multiplies the current IQ pair by the complex conjugate of the previous IQ pair and carries out an accumulate operation. The output of the IQ mix circuitry 524 is input to a low pass filter 522 which provides an accumulate function. The magnitude of the result is the signal power. The phase of the result is frequency. Thus, the output is noise free and the frequency output is used for tracking control.

It should be appreciated that the output of the detector 518 is simply the data.

In a second embodiment, the same task can be carried out on a single signal system such as GPS. To do this the GPS CA-code for a given satellite is split alternately into two components.

Reference is made to FIG. 1 which shows how the GNSS C/A code for a given satellite is used in embodiments of the invention. The first line 10 is the pseudo-random number PRN code. This code consists of a series of 1s and 0s. The second line 20 shows the meaning of the PRN code. Thus, every "1" of the PRN code means "1" and every "0" means "–1".

In embodiments of the present invention the PRN code is split alternatively into two components 22 and 24. The sum of the two components gives the original code at any point. At any point one component is the same as the original C/A code and the other component is 0. The PRN code is effectively divided up into an even code 22 and odd code 22. The code of the PRN code is counted from zero so the first element of the PRN code is "even" code. In other words the odd and even codes are interleaved to provide the original code.

In alternative embodiments of the invention, the code can be split into two codes in any appropriate way. The code can be split for example so that the first m bits are in one code and the remaining n bits are in the other code. Alternatively, instead of alternative single bits, alternative k bits can be used, where k is an integer. For example if k is 2, then the first 2 bits are in one code and the third and fourth bits are in the other code and so on. The pattern for dividing the bits may be regular or may be pseudorandom. In some embodiments of the invention, the single code can be split into three or more codes.

It should be appreciated that there may be a faster sampling rate than one per code chip. However, all of the samples of a particular chip are active in the same code, and zero in the other code.

The even and odd codes are used to despread the GNSS signals. This yields two quasi-independent outputs after integration. Each is 3 dB down in signal strength from the conventional signal. A complex multiply is then performed between the two resulting streams and the integration is carried out again. This integration can be carried out without limit because in each stream there are identical carriers and identical BPSK (Binary phase shift keying) data. After multiplication and integration, the carrier and data are eliminated. The noise is thus reduced as the noise band width is now minimal (that is the reciprocal of the integration period).

This yields only a DC value proportional to the power of the signal which can be used in a traditional early/late tracker. Because of this, the integration is self synchronous; no knowledge of data edges is required. Thus, integration for 1 second to a 1 Hz bandwidth would yield extreme sensitivity, unachievable in a system with conventional clocks that randomly wander by more than that in the search time involved (2046) searches.

Reference is now made to FIG. 2 which shows circuitry for implementing an embodiment of the present invention. It should be appreciated that in practice, implementation of the embodiment of the present invention may be achieved by a computer program, i.e. by a software implementation.

Embodiments of the invention can be implemented in a mixture of hardware and software. For example the circuitry up to the correlators may be in hardware whilst the circuitry downstream of the correlators may be implemented by software.

This same circuitry may be used to implement the first embodiment where two different codes are transmitted. The two different transmitted codes would be used instead of the odd and even codes of this embodiment illustrated in FIG. 2.

The arrangement shown in FIG. 2 shows the real part of the signal (the I part). It should be appreciated that components shown are also arranged to handle the imaginary part of the signal, i.e. the Q part. The components are thus complex components. The information carried on the I and Q channels may be the same or different.

A first mixer 50 is provided. The first mixer receives an intermediate frequency signal at a frequency of 4fo. fo is 1.023 MHz i.e. the nominal frequency. This signal contains the information carried on the L1c channel. The L1c channel is in the L1 frequency range of 1563 MHz-1587 MHz. The primary code length may be is 8184 bits whilst the secondary code may be of the order of 25 bits. It should be appreciated that embodiments of the invention can be carried out on any other suitable signal.

This signal is mixed with a pure frequency signal of 4fo from a local oscillator. This produces a difference signal i.e. the carrier component has been removed from the L1C signal. This difference signal is output to a second mixer 52. The output of the first mixer will generally still have a small frequency component due to the effect of Doppler shift. The approximation of the Doppler shift is provided by a numerically controlled oscillator NCO. Thus, any remaining frequency component of the signal due to Doppler shift has been removed by the second mixer 52. The output of the second mixer is input to a third mixer 54 as well as to a fourth mixer 56. There will be generally a small frequency element, generally at a still lower frequency due to error in the NCO signal.

The third mixer 54 also receives the even code whilst the fourth mixer receives the odd code. The output of the third mixer 54 is input to a first correlator 58 while the output of the fourth mixer 56 is output to a second correlator 60. The first correlator 58 correlates the received signal with the even code whilst the second correlator correlates the received signal with the odd code. The first and second correlators are low pass filters.

The outputs of the first and second correlators are input to a fifth mixer 62. The fifth mixer 62 provides three outputs. The corresponding outputs of the correlators processing the Q signal are input to this mixer 52. The first output is IoddIeven+ QoddQeven which input to an integrator 64. This provides long term integration, which is coherent integration. The output is a noise free amplitude output for code tracking control. The remaining small frequency component is cancelled by this operation.

The fifth mixer 62 also provides the output IoddIeven− QoddQeven and IoddQeven±QoddIeven. Iodd and Qodd represent the output of the first correlator path whilst Ieven and Qeven represent the output of the second correlator path.

The IoddIeven−QoddQeven signal is for the 2f Iout signals whilst the IoddQeven±QoddIeven is for the 2f Qout signal, where f represents the small remaining frequency component. These two signals are input to a second integrator 66 which provides a 2f frequency tracked output signal. This is used to control the NCO so that the f component in the signal is compensated for and effectively removed.

Reference is now made to FIG. 3 which shows a third embodiment of the invention. As with the second embodiment, the elements for processing the real part I of the signal only are shown. In practice, elements for processing the imaginary part Q of the signal would also be provided.

The received signal having an approximate frequency of 4fo IF is input to a first mixer 150 where the received signal is mixed with a frequency of 4fo from a local oscillator. This is similar to the first mixer of the second embodiment.

As with the second embodiment, the output of the first mixer 150 is input to a second mixer 152 where the down converted signal is mixed with a frequency signal from a NCO to provide an output which has been generally compensated to remove the effects of Doppler shift.

The output of the second mixer 152 is input both to a third mixer 154 and a fourth mixer 156. The output of the second mixer 152 is mixed with the L1(b−c) prn (pseudo random number code) by the third mixer 154. The output of the third mixer 154 is input to a first correlator 158. The output of the first correlator is input to first and second discriminators 180 and 182.

The output of the second mixer is mixed with the L1(b+c) prn code by the fourth mixer 156. The output of the fourth mixer 160 is input to the second correlator 160. The output of the second correlator is input to the first and second discriminator 180 and 182.

The first discriminator 180 is able to detect the inputs +2, 0 and −2. If b can have the values +1 or −1 and c can have the values +1 or −1, this means that b+c and b−c will have one of the following results: +2, 0 or −2.

Consider the following example:

| b − c | b + c | b = data |
|-------|-------|----------|
| +2    | 0     | +1       |
| 0     | +2    | +1       |
| 0     | −2    | −1       |
| −2    | 0     | −1       |

As can be seen depending on the results of the inputs, it can be determined what the b data is. This is done by merging the digit streams. If either of the b−c and b+c is +2 it is determined that the b data is +1. Likewise if either of b−c and b+c is −1, it is determined that the b data is −1.

The second discriminator 182 detects the inputs 2, −2 as being active and 0,0 as being inactive. The second discriminator 182 is arranged to invert one stream (the b+c stream in the example although it could be the b−c stream in alternative embodiments) and merge active analogue values. The results are analogue values as a result of noise.

Consider the following example

| b − c | b + c | C = amplitude, secondary code |
|-------|-------|-------------------------------|
| +2.5  | 0.5   | +2.5                          |
| .6    | +2.7  | −2.7                          |
| .7    | −2.6  | +2.6                          |
| −2.8  | 0.2   | −2.8                          |

In line 1, b−c is detected to have the value of +2.5 and b+c is detected to have the value 0.5. It is then determined that the b−c result is active and the b+c result is inactive and the result is then taken to be 2.5. In line 2, b−c is detected to have the value of 0.6 while b+c is detected to have the value of +2.7. b−c is determined to be inactive. b+c is inverted and the result is taken to be =2.7. This has the advantage that the noise from the inactive stream is excluded. This can give a 3 dB SNR benefit. Additionally the combination of full satellite energy in the active stream gives a 3-6 dB gain.

Reference is made to FIG. 4 which shows an example of Tricode Hexaphase according to the prior art. The first line shows an example of a b code of −1 −1 +1 +2 −1 +1 +1. The example c code is shown on line 2 and is −1 +1 +1 +1 +1 −1 +1. b−c is therefore 0 −2 0 0 −2 +2 0 as shown on line 3. This is scaled to 0 −1 0 0 −1 +1 0 as shown in line 4. Line 5 shows b−c again.

The final line shows the results of the inverted correlation 0 +2 0 0 +2 +2 0.

The full power is recovered where the inverse of data is equal to the secondary code otherwise the result is zero. The three states are +, − and disable.

Reference is made to FIG. 5 which shows an example of tricode Hexaphase used in the third embodiment of the invention. Lines 1 to 3 are as shown in FIG. 4. Lines 5 and 6 are as shown in FIG. 5.

Line 4 show the B+C code and line 7 the b+c signal which is −2 0 +2 +2 0 0 +2. The inverse correlation signal is shown in line 8 and is +2 0 +2 +2 0 0 +2. In other words if b−c is 0, the correlation result is 0 and if the b−c is + or −2 the result is +2.

As can be seen full power is recovered both when data=secondary code and when the inverse data=secondary code using the two different paths. A two state code only is used. The two states are +2 and 0. In other words one of the b+c correlation and the b−c correlation is active when the other is inactive.

Figure 6:
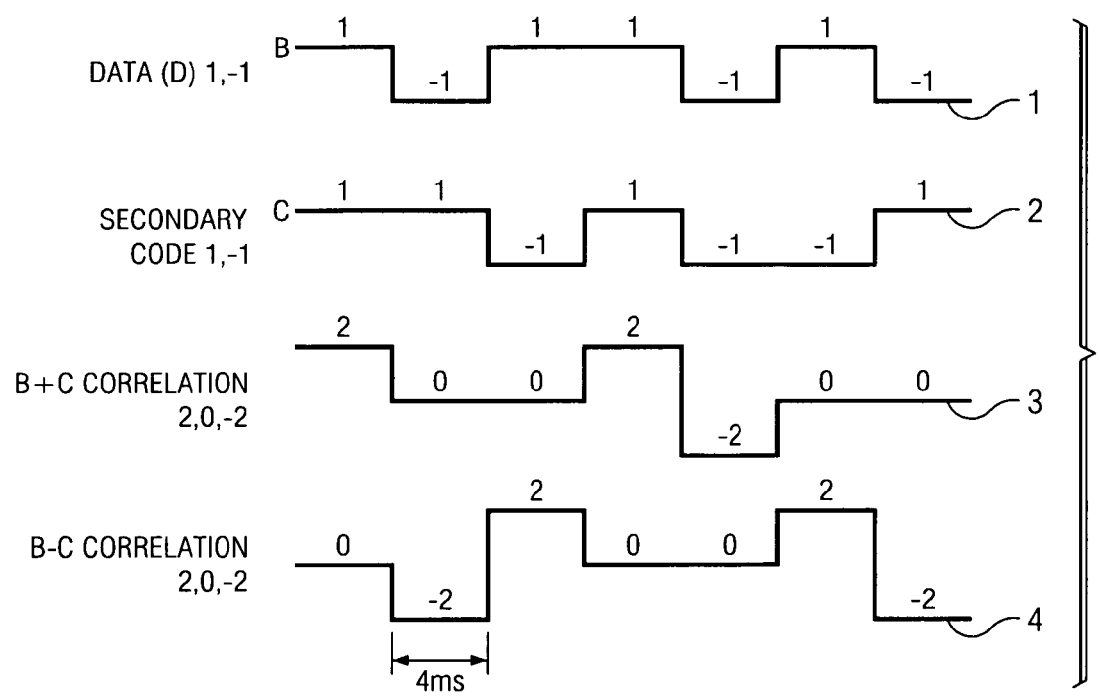
FIG. 6 shows a timing diagram of the signalling shown in FIG. 5.

Reference is made to FIG. 6 which shows a timing diagram. Signal 1 is the data and can have states + or −1. This corresponds to B. Signal 2 is the secondary code and can have the state + or −1. Line 3 shows the B+C correlation which has three states −2, 0, +2. Line 4 shows the B-C correlation and can have the value 2, 0, −2.

It is possible to operate from the b−c correlation alone. The secondary code symbols can be synchronised for this data. If the signal is +2, the data is +1 and secondary code is +1. If the signal is −2, then the data is −1, and secondary code is −1. If the signal is 0 then the data=−secondary code. This last determination can be made after synchronisation.

Thus, referring back to FIG. 3, the output of the second discriminator is thus secondary code symbols and is provided to a secondary code detector 190 which can be used for unaided outdoor acquisition. The output of the second discriminator is also input to a fifth mixer 184 which receives an input 186 of locally generated or stored secondary codes.

The output of the fifth mixer is input to a correlator 188, again in the form of a low pass filter. This filter is programmable so that the integration period can be varied. As more information becomes available, the period of the integration can be increased. The output of the correlator provides a low noise amplitude and frequency output for frequency control.

In a further embodiment of the present invention, it is proposed that the L1B and L1C channels or signals include identical data. Accordingly, the L1B channel or signal comprises the carrier component, the b spreading code and data. The L1C signal or channel comprises the carrier, the c spreading code and the same data. The L1C and L1B channels are on the same frequencies. Thus, this contrasts with some of the previously described embodiments, in that the L1C signal would not include a secondary code.

This results in three advantages. Firstly, correlation with b−c composite code would always be successful and would use all the satellite energy in a single channel for maximum sensitivity. The IQ mix/dot product algorithm could be used between the independent L1B and L1C correlated channels with simultaneous samples, resulting in an integration uncorrupted by data transitions or residual rotation for acquisition purposes. The correlation with the b–c composite code could be used for frequency tracking and data download.

The third advantage is that the cross-correlation response of the system would be greatly improved. The result of the IQ mix algorithm is the product of b and c. An interfering signal must cross-correlate with both of them to provide a significant problem. If the signal had an average CDMA isolation of 36 dB from each, worst case of 26 dB, there might be 52 dB isolation. However, since the codes are synchronous, only one can be at its worst so it would be more reasonable to say 36+26=62 dB. These are the theoretical values. In practice, the improvement may not be quite as large but nevertheless some significant improvement could be expected.

The first advantage in sensitivity i.e. correlation with the b–c composite code is an important advantage. The output of the correlator is an amplitude not a power. If the signals can be combined coherently, a doubling is thus 6 dB while combining later in the system as in other proposals is only 3 dB. Additionally, the noise amplitude is half as (b–c) is zero 50% of the code chips with all the energy transmitted on the L1A channel instead and with b–c=0 in a correlated reference code, half that noise can be rejected.

Benefits achieved by some embodiments of the present invention may be achieved immediately in the 4 millisecond period. The ability to eliminate residual rotation and data bit edges gives the flexibility of integration period that adds even more sensitivity when the integration period is extended to longer periods for indoor use, making the system much more sensitive or eliminating problems of crystal/TCXO stability.

It should be appreciated that it is believed that the above described embodiment provides a better advantage than using a single code. Users can use b or c or a combination depending on the complexity affordable or necessary in the application. Additionally, the fact that the b–c signal is 50% full power, 50% zero power means that correlating with b–c or b+c provides better signal to noise ratio for the same transmitted average power. Using identical data symbols on the L1B and the L1C channels gives a further improvement in the signal to noise ratio.

Figure 9:
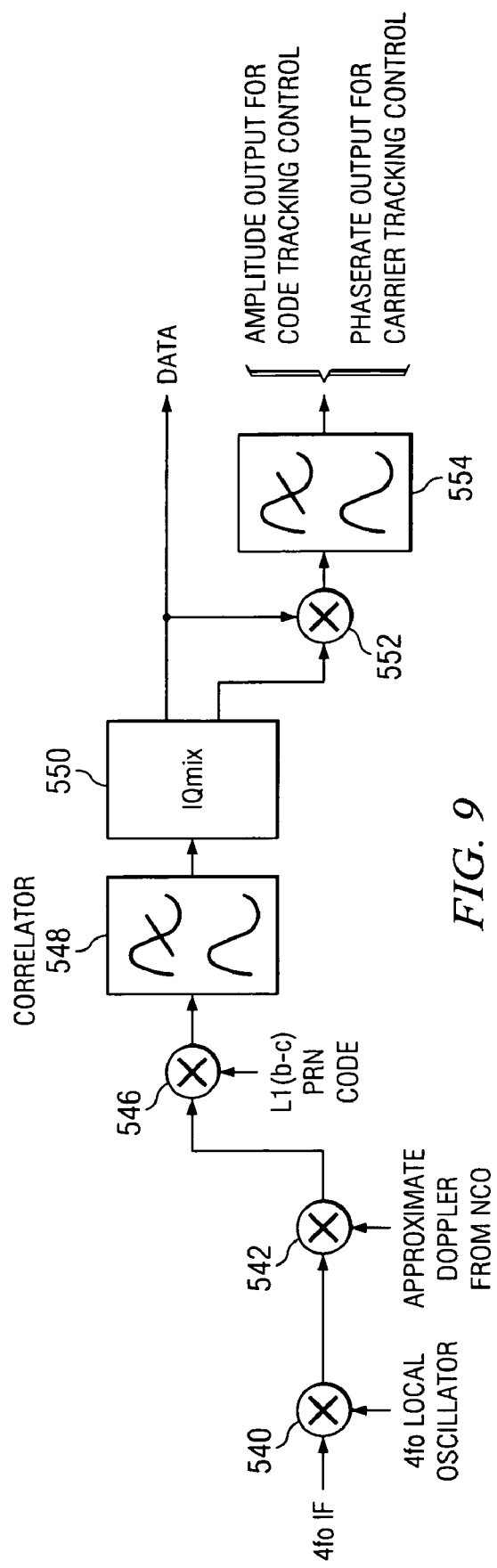
FIG. 9 shows an embodiment of the present invention where the two received signals have the same data thereon.

Reference is now made to FIG. 9 which shows circuitry for implementing this embodiment of the present invention.

In the arrangement of FIG. 9, only the I channel is shown for simplicity.

The input to the first mixer 540 is 4foIF. The output of the first mixer 540 is input to a second mixer 542. The first and second mixers provide similar functions to for example mixers 500 and 502 of FIGS. 7 and 8. The output of the second mixer is input to a third mixer 546. The signal which is more or less at base band frequency is mixed with the code b–c. The output of the third mixer 546 is input to a correlator 548. The functions provided by the third mixer 546 and correlator 548 are similar to those provided by for example mixer 504 and correlator 508 of FIGS. 7 and 8. However, the spreading code used is different.

The output of the correlator 548 is input to IQ mix circuitry 550 which is similar to that described in relation to FIG. 8. The output of the IQ mix circuitry 550 provides a first output which is the data. The second output of the IQ mix circuitry 550 is input to a fourth mixer 552 which also receives the first output of the IQ mix circuitry 550. This will remove the data. The output of the fourth mixer 552 is input to a low pass filter 554 which provides similar function to the low pass filter 522 of FIGS. 7 and 8.

In practice, the detect function illustrated in FIG. 8 may be provided by the IQ mix circuitry. The IQ mix circuitry will remove the frequency component. This is because this embodiment is unlike other embodiments which have two correlation results to mix together to cancel the frequency component. The IQ mix circuitry effectively converts the frequency into phase angle which will be constant for a constant frequency. Thus the output of the circuitry of FIG. 9 and more precisely the low pass filter 554 will provide a phase rate output which is used for carrier tracking control. This output can be used to control the NCO used to control mixer 542. The low pass filter will also provide an amplitude output as described previously which can be used for code tracking control. There is no data on this output.

As can be seen, the circuitry of FIG. 9 is very much simplified in that a single path is required as the received signal which includes the L1B channel and the L1C channel needs to be correlated with the single code, b–c. Thus, this reduces the circuitry required. Additionally, unlike the arrangement where correlation is carried out with b+c as well as b–c, no decision needs to be made as to which of the two results of the correlation need to be used.

The arrangement shown in FIG. 9 is particularly useful for tracking. Depending on the quality of the signals, the circuitry can potentially be used for acquisition.

Figure 10:
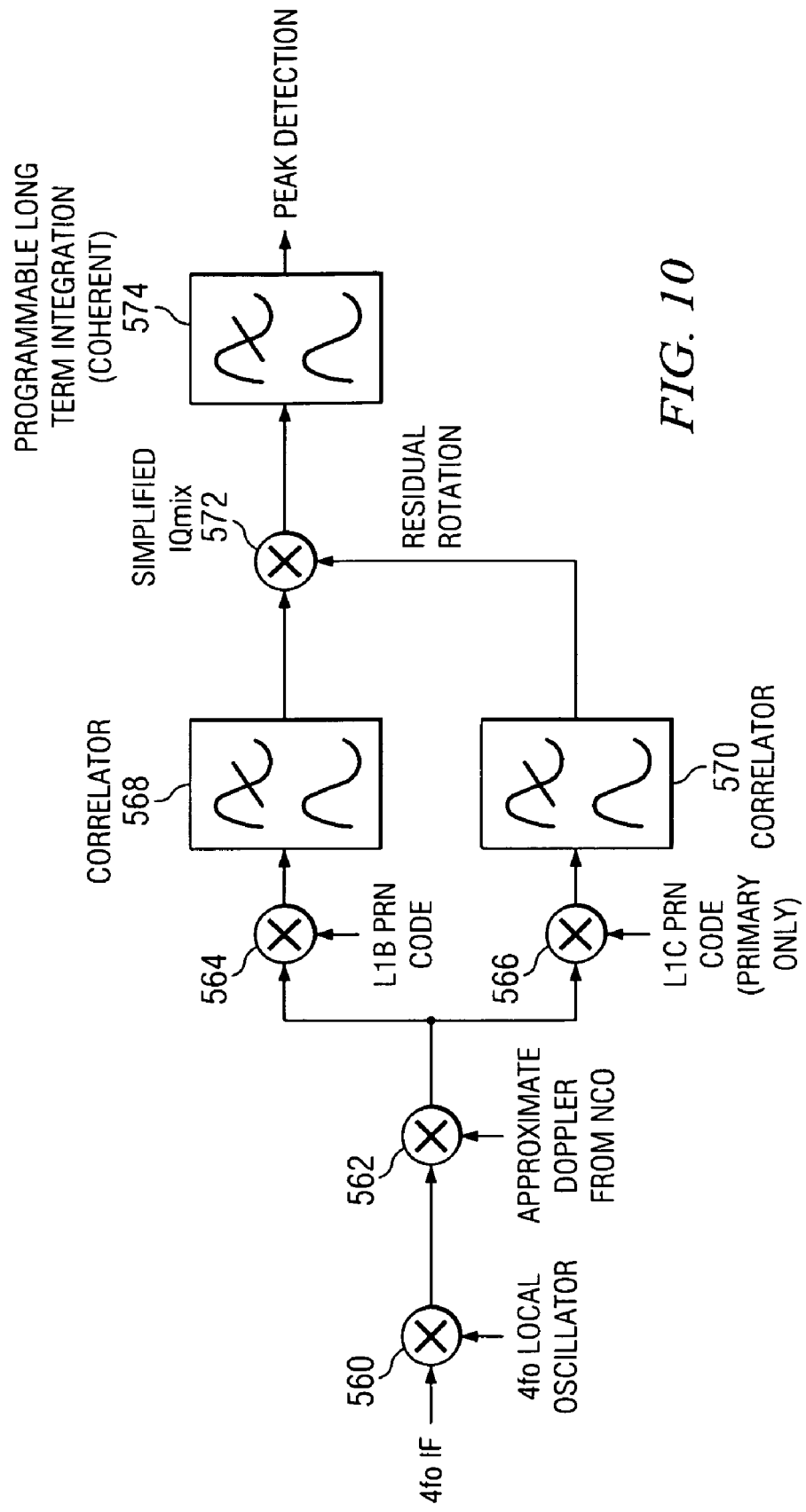
FIG. 10 shows a further embodiment for processing two signals having the same data thereon.

Reference is now made to FIG. 10 which shows circuitry which is particularly applicable for acquisition where the same data is provided on the L1B and L1C channels.

The arrangement comprises first and second mixers 560 and 562 which provide similar functions to for example the first and second mixers of FIG. 7. Third and fourth mixers 564 and 566 are arranged to receive the output of the second mixer 562. The third mixer 564 mixes the signals from the second mixer 562 with the b code.

The fourth mixer 566 mixes the output of the second mixer 562 with the c code. The output of the third and fourth mixers 564 and 566 are output respectively to first and second correlators 568 and 570. These correlators provide similar functions to those described in relation to for example FIG. 7.

The outputs of the two correlators are input to a mixer 572 which provides a simplified IQ mix function. This is able to cancel the frequency and the data. The function is simplified as compared to the IQ mix circuitry of for example FIG. 8 in that the data has been cancelled. The IQ values from the b channel are multiplied by the IQ values from the c channel in the arrangement of FIG. 10. In contrast in the arrangement of FIG. 8, the IQ values are the current pair multiplied by the previous pair. The IQ mix of FIG. 10 only needs to perform the functions IcIb±QbQc. The IQ circuitry does not need to perform the functions IcQb±IbQc as the result of these function will be zero.

There is a residual rotation, that is a low or residual frequency component. By using the residual rotation, the NCO can be controlled to compensate for this frequency component.

The output of the fifth mixer 572 is input to a correlator 574 which provides a similar function as, for example, correlator 552 of FIG. 7. This is able to provide long term integration i.e. integrate over a relatively long period.

It should be appreciated that once again all elements exist in I and Q. For simplicity, the real components only are shown for simplicity.

Thus, this embodiment allows a simple removal of data and residual rotation for acquisition purposes. The results achieved can be equivalent to but in certain circumstances better than having a secondary code on one channel and data on the other. There is more power available, there is less noise and there are good cross-correlation characteristics.

Furthermore, embodiments of the present invention which use the same data on both the channels result in low cost simpler hardware.

It should be appreciated that whilst specific embodiments of the present invention have been described in the context of the GALILEO L1B and L1C signals, embodiments of the present invention can be used with any other suitable signals.

In general, embodiments of the present invention are particularly applicable where the two signals in question have the same frequency and are from the same source. Thus, in embodiments of the present invention, the techniques shown allow the unknown i.e. the frequency effects to be cancelled out because each of the two signals will have the same value for the frequency.

In those embodiments which use b−c, it is possible to use alternatives such as c−b. It may be possible to use other more complex functions of b and c in some embodiments.

It should be appreciated that embodiments of the present invention also relate to the provision of a transmitter, for example in a satellite which is able to transmit two signals having the same carrier frequency, the same data but different spreading codes. Embodiments of the present invention also relate to receivers for receiving signals from a satellite.

The two channels are transmitted at the same time in preferred embodiments of the invention so that it can be assumed that the frequency, made up of the transmission frequency and the Doppler shift, of the two channels are the same.

Furthermore, embodiments of the present invention have been described primarily in the context of obtaining data from satellite navigation signals. However, it should be appreciated that embodiments of the present invention can be used for processing any two or more signals transmitted from a common source on the same carrier frequency but with different spreading codes.

Embodiments of the invention have been in the context of the acquisition and tracking of a signal. Particular advantages may be achieved in the context of acquisition. It should be appreciated that embodiments of the invention may be applied to any other suitable signal. It is intended that the present invention encompass such changes and modifications as fall within the scope of the appended claims.

What is claimed is:

1. A system comprising:
a correlation circuit configured to:
receive a signal having at least a first channel and a second channel, the first and second channels having a common carrier frequency and carrying common data, the first and second channels having respective first and second codes applied thereto, the first and second codes being different,
correlate the signal with a third code to produce a first output, the third code being derived from a first function of the first and second codes, and
correlate the signal with a fourth code to produce a second output, the fourth code being derived from a second function of the first and second codes, where the second function is different than the first function; and
a processor configured to process the first and second outputs to produce a third output for at least one of: tracking of the signal; acquisition of the signal; and extracting information from the signal.

2. A receiver as claimed in claim 1, wherein the third code is derived from at least one of a sum and a difference between the first and second codes.

3. A receiver as claimed in claim 1, wherein the processor is further configured to merge the first and second outputs to obtain symbols carried on one of the first and second channels of the signal.

4. A receiver as claimed in claim 3, wherein the output of the processor is input to a second correlation circuit configured to synchronize at least some of the symbols with a locally generated code.

5. A system comprising:
a first correlator circuit configured to:
receive a signal having at least a first channel and a second channel, the first and second channels having a common carrier frequency and carrying common data, the first and second channels having respective first and second codes applied thereto, the first and second codes being different, and
correlate the signal with a third code derived from the first and second codes to produce a first output;
a second correlator circuit configured to:
receive the signal and
correlate the signal with a fourth code to produce a second output, the fourth code being derived from the first and second codes, wherein the third code and the fourth code are different; and
a processor configured to process the first and second outputs to produce a third output.

6. A system as claimed in claim 5, wherein the third code comprises a difference between the first and second codes.

7. A system as claimed in claim 5, wherein the fourth code comprises a sum of the first and second codes.

8. A system as claimed in claim 5, wherein the processor is further configured to merge the first and second outputs to obtain symbols carried on one of the first and second channels.

9. A system as claimed in claim 5, wherein the processor is further configured to invert one of the first and second outputs and merge the inverted output with the other of the first and second outputs to obtain symbols carried on one of the first and second channels.

10. A system as claimed in claim 8, wherein the processor is further configured to determine whether one of the first and second outputs is inactive and, if so, to exclude the inactive output from the merging.

11. A system as claimed in claim 8, wherein the third output is input to a third correlation circuit configured to synchronize at least some of the symbols with a locally generated code.

12. A system comprising:
a first correlator circuit configured to:
receive a signal having at least one code applied thereto, the signal having a frequency, and
correlate the signal with a first code to provide a first output;
a second correlator circuit configured to:
receive the signal, and
correlate the signal with a second code to provide a second output, wherein the first code and the second code are different; and
a processor configured to process the first and second outputs to cancel the frequency,
wherein the signal comprises at least two channels having the frequency, a first one of the channels has a first known code applied thereto and a second one of the channels has a second known code applied thereto, the first code comprising a first function of the first and second known codes and the second code comprising a second function of the first and second known codes, the first function different than the second function.

13. A system as claimed in claim 12, wherein the processor is configured to mix the first and second outputs to cancel the frequency.

14. A system as claimed in claim 12, wherein the first code comprises the first known code and the second code comprises the second known code.

15. A system as claimed in claim 12, wherein the first function comprises a sum of the first and second known codes and the second function comprises a difference of the first and second known codes.

16. A system as claimed in claim 12, wherein the processor is further configured to merge the first and second outputs to obtain symbols carried on one of the at least two channels of the signal.

17. A system as claimed in claim 16, wherein the processor is further configured to determine if an output from one of the first and second correlator circuits is inactive and, if, so to exclude the inactive output from the merging.

18. A system as claimed in claim 16, wherein an output of the processor is input to a third correlation circuit configured to synchronize at least some of the symbols with a locally generated code.

19. A system as claimed in claim 12, wherein the processor is further configured to invert one of the first and second outputs and merge the inverted output with the other of the first and second outputs to obtain symbols carried on one of the at least two channels of the signal.

20. A system as claimed in claim 19, wherein an output of the processor is input to a third correlation circuit configured to synchronize at least some of the symbols with a locally generated code.

* * * * *